Jan. 24, 1967 — H. ISAACS — 3,300,071
DETACHABLE CARGO BODY AND VEHICLE WITH ELEVATING MECHANISM FOR SAME
Original Filed Nov. 21, 1961 — 4 Sheets-Sheet 1

INVENTOR.
HAROLD ISAACS
BY
ATTORNEYS

Jan. 24, 1967          H. ISAACS          3,300,071
DETACHABLE CARGO BODY AND VEHICLE WITH ELEVATING
MECHANISM FOR SAME
Original Filed Nov. 21, 1961          4 Sheets-Sheet 2

INVENTOR.
HAROLD ISAACS
BY
ATTORNEYS

INVENTOR.
HAROLD ISAACS
ATTORNEYS

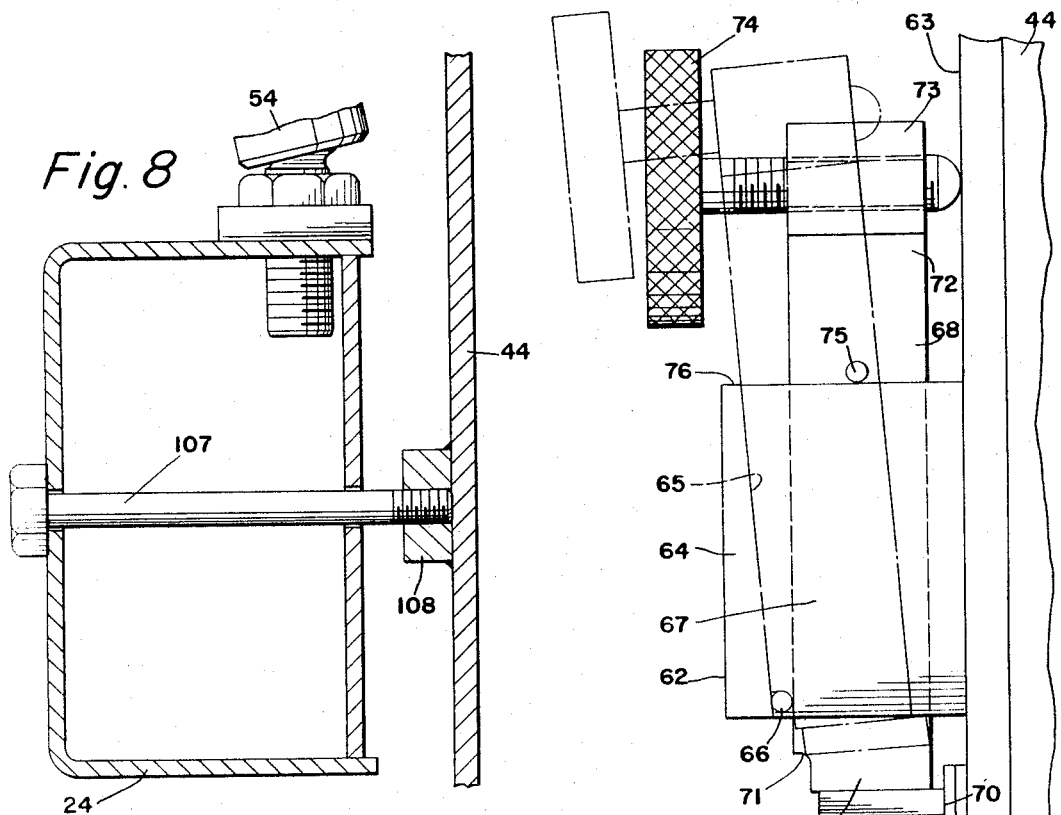
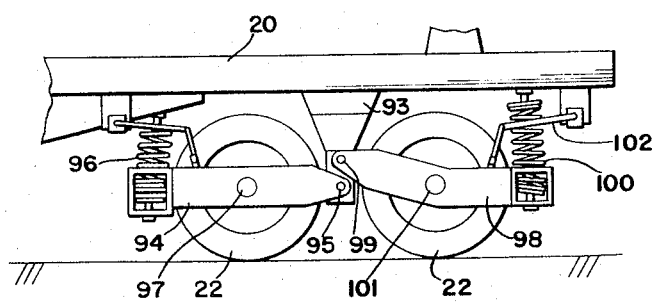
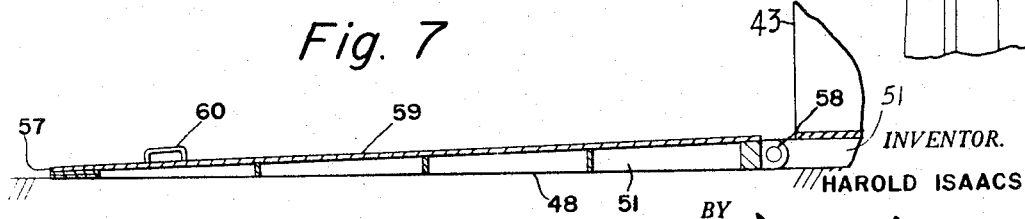
INVENTOR.
HAROLD ISAACS

United States Patent Office 3,300,071
Patented Jan. 24, 1967

3,300,071
DETACHABLE CARGO BODY AND VEHICLE
WITH ELEVATING MECHANISM FOR SAME
Harold Isaacs, University Heights, Ohio, assignor to
Edith Isaacs, University Heights, Ohio
Original application Nov. 21, 1961, Ser. No. 153,975, now
Patent No. 3,244,310, dated Apr. 5, 1966. Divided
and this application Oct. 21, 1965, Ser. No. 500,059
6 Claims. (Cl. 214—390)

This application is a division of my application Serial No. 153,975 filed November 21, 1961, for Detachable Cargo Body and Vehicle With Elevating Mechanism for Same, now Patent No. 3,244,310.

The present invention relates generally to material or cargo handling vehicles, and more particularly to a cargo vehicle or truck having a load-carrying body releasably carried by the truck and adapted to be elevated and lowered relatively to the loading level.

It is a primary object of my invention to provide a cargo carrying vehicle with a detachable body which can be loaded at ground level or dock level, either apart from the vehicle or associated with the vehicle, which body can be transported to destination and unloaded at ground level or at higher levels.

Another object of my invention is to provide a vehicle and associated elevating mechanism which is adapted to accomplish the foregoing in a safe and satisfactory manner.

A further object of my invention is to provide a detachable cargo body or container which, in relation to the legal limits on over-the-road dimensions, will have greater payload capacity than existing cargo bodies.

Another object of my invention is to provide novel means for supporting such a detachable cargo body in its transport position on the vehicle.

Still another object of my invention is to provide a light, yet rigid and sturdy, cargo body which utilizes its loading gate as a structural member.

Another object of my invention is to provide a vehicle of the character described having improved and novel suspension means for the frame or chassis.

Other objects and advantages of my invention will be apparent during the course of the following description.

In the accompanying drawings forming a part of this specification and in which like numerals are employed to designate like parts throughout the same, FIG. 1 is a side elevation of a vehicle embodying elevating and support mechanism of my invention, with a cargo body or container shown detached from the vehicle for loading.

FIG. 5 is a sectional view of the clamping device which is utilized for securing the gate of the cargo body in closed position.

FIG. 6 is a sectional view of the gate of the container in its open position for service as a loading ramp.

FIG. 7 is a fragmentary side elevation of the wheel suspension arrangement viewed as indicated by line 7—7 in FIG. 2.

FIG. 8 is a fragmentary sectional view similar to FIG. 3 showing a modification of the securement of the container to the lifting frame.

Figure 1:
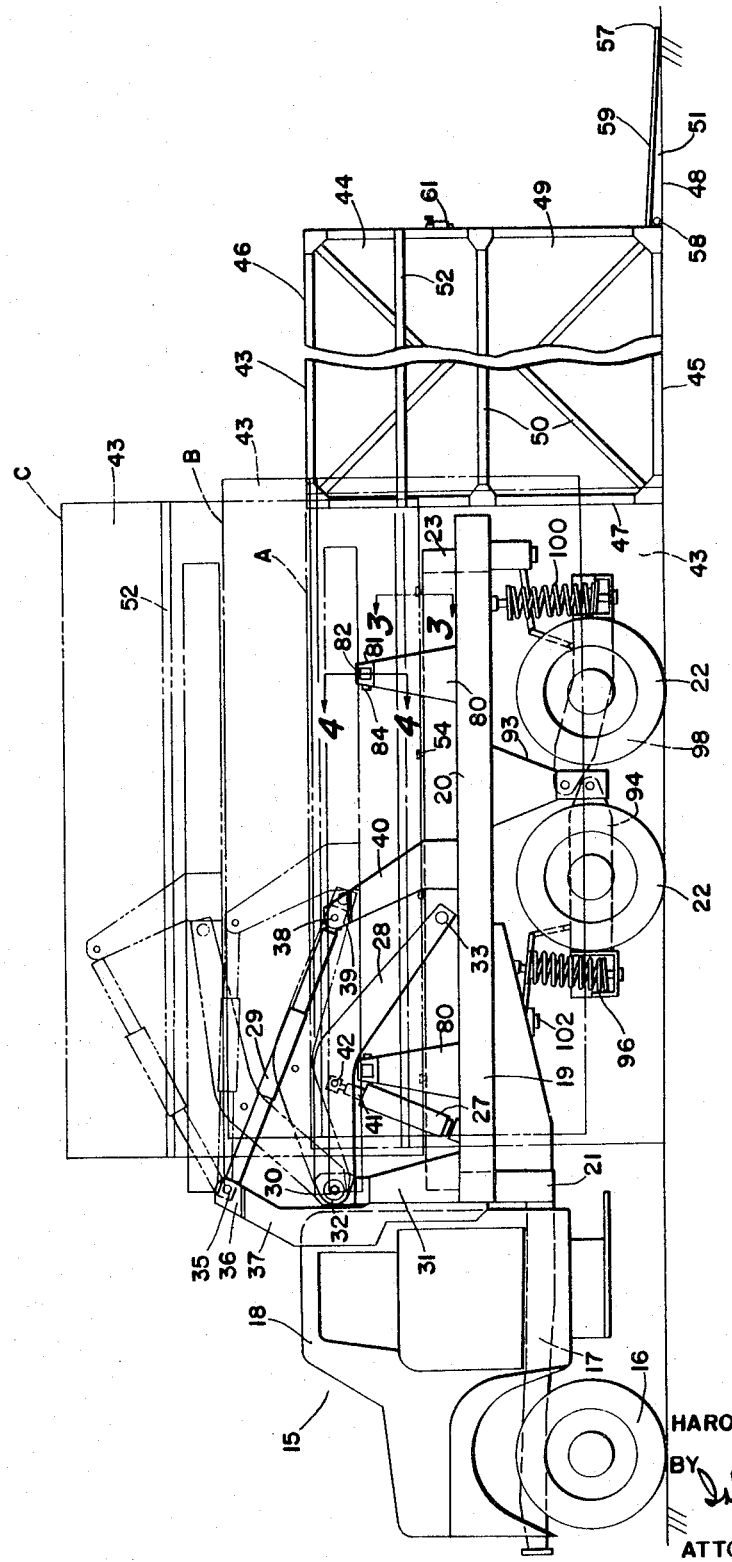
Figure 2:
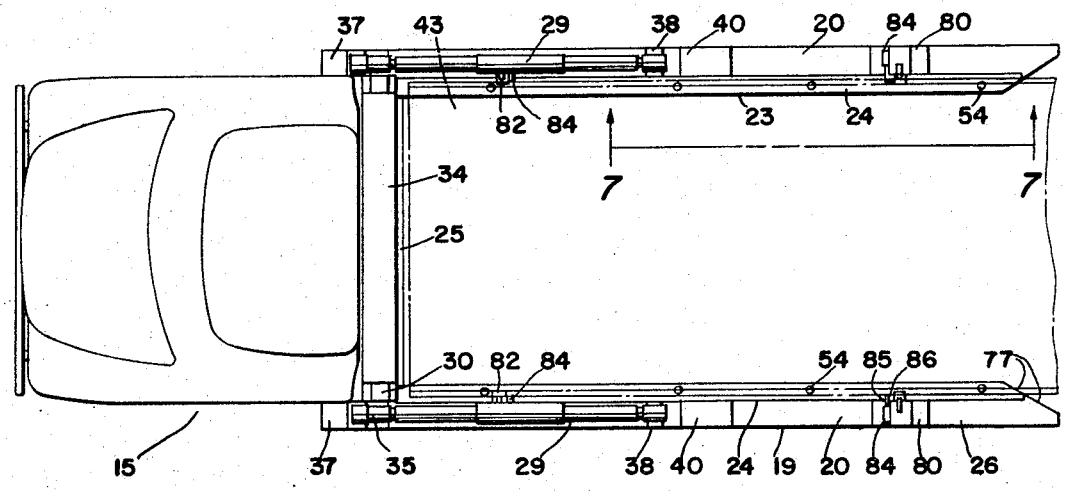
FIG. 2 is a top plan view of the vehicle of FIG. 1 with the container shown in phantom outline in transport position.

Referring more particularly to FIGS. 1 and 2 of the drawings, I have shown, in general outline, a prime mover 15, which is of the capacity and character ordinarily employed in trucks or tractors for transporting cargo. The front wheels 16 of the truck are the driving wheels, in contrast to the rear wheel drive usually employed in tractors and trucks of this type. A suitable sub-frame assembly 17 underlies the cab unit 18 and is rigidly joined, by welding or the like, to an elevated fixed frame 19, which extends rearwardly of the cab unit 18 in a substantially horizontal plane.

The fixed frame 19 is U-shaped in design with the longitudinally-extending side members 20 being rigidly secured to a cross-member 21 which forms the base of the U closely adjacent to the rear of the cab unit 18. The frame 19 is open at its rear (the top of the U) and defines an unobstructed, clear passage for horizontal movement of a body between the side members 20 toward the cross-member 21. The frame 19 is supported above ground level by tandem wheels 22 which are positioned approximately midway relatively to the length of frame 19. The details of the suspension assembly will be more fully described hereinafter.

The fixed frame 19 supports elevating mechanism for a lifting frame 23 having longitudinally-extending side members 24 rigidly secured to a cross-member 25 at the forward end of the frame 23. The frame 23 is of U-shape design and conforms substantially to the outline shape of the fixed frame 19, although it is somewhat narrower in its external width than the frame 19. This results primarily from the fact that the side members 24 of the lifting frame 23 are of narrower width than the side members 20 of frame 19. The frame 19, thus lies in the path of movement of the frame 23 and underlies it while providing a peripheral surface area 26 on which the components of the elevating mechanism can be mounted without obstructing the abutment of the frame 23 on the frame 19. The side members 20 of frame 19 define an overall width equal to the legal width limit for highway use, now 96". The width of each individual frame member 20 is no greater than the width of the underlying wheel and suspension member. The inboard edges of the lifting frame side members 24 coincide with the like edges of members 20, however, this edge relationship is not mandatory.

The lifting frame 23 hydraulically actuated in its slightly arcuate vertical movement by a pair of hydraulic cylinders 27 which act upon a parallelogram linkage consisting of a pair of lower lifting links 28 cooperably associated with a pair of upper stabilizing compression-tenson links 29. It will be understood that the structure and mechanism embodied on one side of the vehicle is duplicated on the opposite side of the vehicle, so that it will hereafter suffice to describe only one side of the vehicle.

The lifting link 28 is pivotally secured at its forward end 30 to the upper end 32 of a standard or pedestal 31 which is fixed to the surface 26 of the fixed frame 19 and projects upwardly therefrom at the forward end of the frame. It will be noted that the lifting link 28 is of dog-leg configuration to avoid interference with other components which are mounted on frame 19, as well as to provide accommodation for a sufficiently long stroke and more nearly vertical direction of thrust of the lifting cylinder 27. The rearward end of the lifting link is pivotally secured, as at 33, to the outboard side of the longitudinal member 24 of the lifting frame 23. A torque tube 34 is connected at its opposite ends to the upper ends of the lifting links 28 for coaxial movement therewith.

The link 29 is pivotally secured, as at 35, at its forward end to the upper end 36 of a standard or pedestal 37 which is rigidly affixed to the forward end of the fixed frame 19 and extends upwardly therefrom. The rearward end of the stabilizing link 29 is pivotally secured, as at 38, to the upper end 39 of a standard or pedestal 40 which is rigidly mounted on the surface 26 of the frame 19. The positions of the pivotal connections 30, 33, 35 and 38 establish the parallelogram linkage, heretofore mentioned, for maintaining the frame 23 in a substantially horizontal plane during its elevating and lowering movements.

The hydraulic lift cylinder 27 is provided with a piston rod or jack 41 which is pivotally secured, as at 42, to a portion of the lifting link 28 which lies intermediate the pivoted ends of the link. The base of the cylinder 27 is swivel-mounted on the surface 26 of the fixed frame 19. This swivel mounting is shown in greater detail in FIG. 9 of the drawings and is more fully described hereinafter.

The container or cargo body 43 can be any desired form of tank type, flat-bed type, beverage type load-carrying unit, which may be particularly designed or adapted for a specialized cargo or load, but is here shown as the box or van type of body. The body 43 has sides 44, a bottom 45, a top 46, a fixed end wall 47 and a partial, movable end wall 48 which also serves as an end gate and loading ramp. The body may be made of a suitable material and is here shown made of sheet steel panels 49 joined by welding and suitably reinforced by an arrangement of ribs 50 on the side walls, the top wall and the end wall 47. The load-bearing bottom 45 and the end gate 48 are reinforced more heavily by a gridwork 51 of structural members, as shown in FIG. 6.

The container 43 may have a length greater than the length of the lifting frame 23, although it should not be of such extreme length as to create a condition of imbalance or instability relatively to the support provided by the lifting frame. Preferably, it is of a length which would not cause it to project more than 15% of its length beyond the open end of the lifting frame. It is intended that the containers be furnished in what may be termed "modular" lengths. For example, the vehicle may be designed to accommodate a 15 foot body which would be a "full length" body in this particular instance. Half-length and quarter-length bodies are also provided which would permit the vehicle to carry two half-length bodies or four quarter-length bodies or combinations thereof for cargo-handling conditions in which "containerization" shipment is desirable, but the full length body is too large for the cargo involved. A 30 ft. trailer could accommodate two of such 15 ft. full length bodies, or four half-length bodies. The half-length bodies could also be positioned in the width of such a trailer which is normally slightly less than 8 ft. wide. Similarly, the "modular" lengths could be accommodated in railway cars without any significant space loss.

The width of the container must be such as to be accommodated within the lifting frame 23 and preferably permit a reasonable clearance, for example, 2 inches overall. It will be understood that highway laws, with respect to the height, width and length of cargo vehicles, place limitations upon the size of the vehicle and the container for over-the-road travel. Therefore, the containers are nominally six feet in width, as herein described, for highway travel and the overall width of the vehicle is eight feet. However, where the vehicle and containers are designed solely for off-highway use, these limitations will not apply. Thus, a very high container could be wider in its upper portion than in the frame-embraced lower porton.

In transport position, indicated by the phantom outline B in FIG. 1, the container 43 is elevated to an intermediate level between ground level, indicated by phantom outline A in FIG. 1, and the maximum elevated position, indicated by phantom outline C in FIG. 1. In the transport position, the bottom 45 of the container may be from 18 to 24 inches above ground level, depending upon the weight of the cargo. The height of the container, for highway travel, must be such as to meet the legal requirements when the container is elevated to transport position. However, inasmuch as the design of the vehicle permits the bottom of the cargo body 43 to be carried about two feet lower than conventional cargo bodies, the container 43 has a greater payload capacity than conventional bodies of like height. This feature also results in a lower center of gravity.

Figure 3:
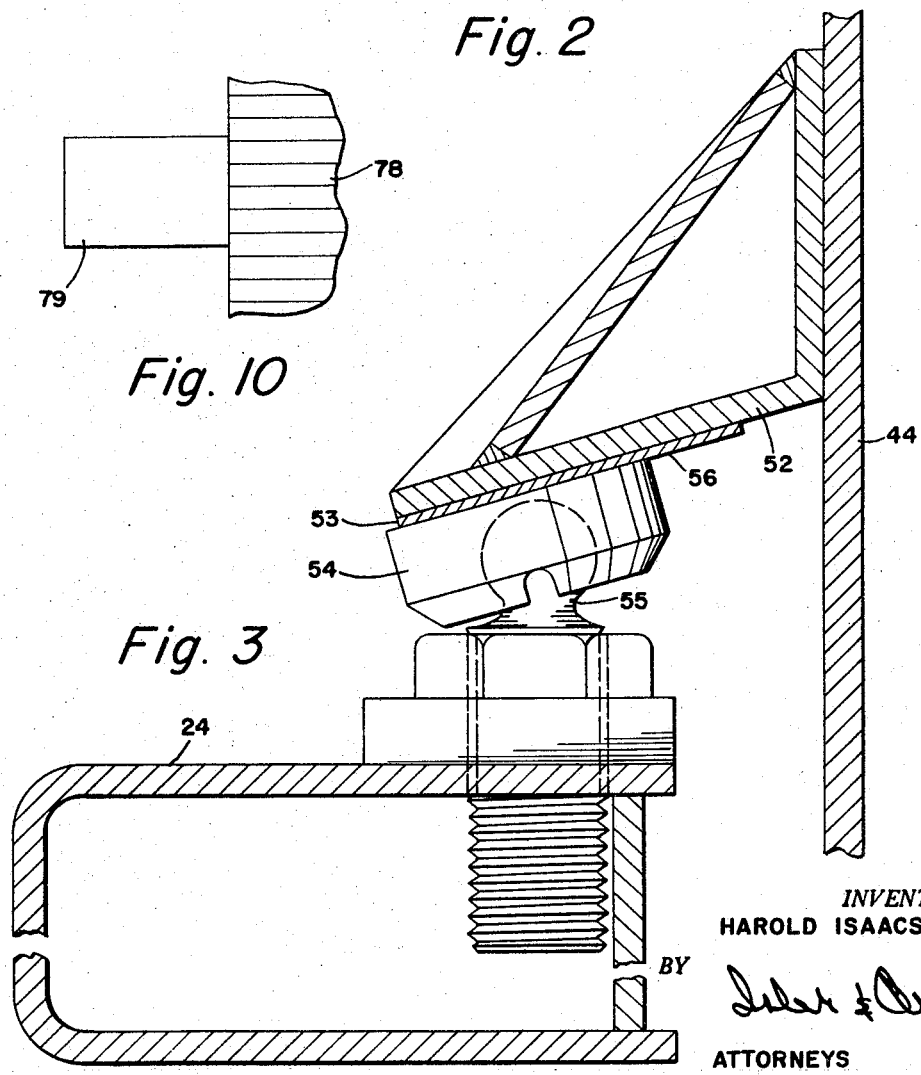
FIG. 3 is a fragmentary sectional view taken on line 3—3 of FIG. 1 and showing details of the means for centering the container on the lifting frame of the vehicle.

The container 43 is provided on the exterior of its side walls with laterally-projecting support means, here shown as a longitudinally extending rail 52 which has an angularly projecting leg portion 52a and a securing leg portion 52b which is fixed in abutment with the side wall 44. The leg portions of the rail may be braced or reinforced by a web element 52c secured between the legs 52a and 52b coextensive with the length of the rail. Further reinforcement or bracing of the rail 52 may be provided at spaced points by transverse plates 52d which are welded or otherwise secured between the leg portions 52a and 52b. The underside of the leg portion 52a may be reinforced at selected points by wear blocks 53. The wear blocks 53 are positioned to engage suitable centering devices on the lifting frame 23. The centering devices are here shown as spaced swivel pads 54 which are mounted for universal movement on the upper surface of the lifting frame side members 24 by means of a height-adjustable ball and socket connection 55 (See FIG. 3). The wear blocks 53 provide a downwardly inclined abutting surface 56 which is disposed at a shallow angle of about 15° to the horizontal plane of the lifting frame 23. When the blocks 53 come to rest upon the complementary disposed surface of the swivel pads 54, the weight of the container 43 and any load therein causes the container to be shifted slightly to one side or the other to a position of equilibrium when it is centered with respect to the lifting frame side members 24. The shallow centering angle is not sufficient to overcome the frictional resistance to movement when the container is on the ground, but permits the centering to occur as the container is elevated. The centering arrangement also imposes a desirable inboard stress on the frame members 24 which tends to overcome any tendency of these members to spread under heavy load.

One of the stated objectives of my invention is to accomplish ground level loading or unloading of cargo. As illustrated in solid lines in FIG. 1, the cargo body 43 may be loaded or unloaded remote from the vehicle. Or, as indicated in phantom outline A, such loading or unloading at ground level may take place while the body 43 is associated with the vehicle. For convenience in such use, the movable end wall or gate 48 of the container serves as a ramp when in its lowered position. The container is so designed that the load carrying surface of the reinforced bottom 45 is only about two inches above ground level when the container is at rest. The reinforcing gridwork 51 on the exterior of the gate 48 is tapered toward the upper edge 57 of the gate, so that when the gate is pivoted about its hinge 58 the interior surface 59 of the gate inclines downwardly from the hinge point to provide a sloping ramp surface whose entry edge 57 is substantially at ground level, as best seen in FIG. 6. Cargo can thus be handled conveniently and easily either manually or using mobile aids such as hand trucks, skid trucks, fork trucks, etc. Handles 60 are provided on the gate or ramp to facilitate the raising or lowering thereof.

The gate 48 not only serves to close the open end of the container and as a loading ramp, but also serves as a structural component of the container. In the absence of a structural component across the open end of the container, there would be a strong possibility of buckling of the walls under load, particularly when a thin wall, weight-saving construction is utilized, as herein disclosed. This possibility can be avoided by the use of heavier walls and reinforcing members, but this would substantially increase container weight and thickness and correspondingly reduce the payload weight which could be carried. In order to rigidly integrate the gate 48 with the side walls 44 of the container and at the same time still permit quick release and securement of the gate, I have provided a novel gate-securing device in the form of a pair of clamps 61, the details of which are shown in FIG. 5.

The clamping device 61 includes a three-sided housing 62 of U-shaped cross-section which is fixedly secured to the edge surface 63 of each side wall 44 at a location closely adjacent and immediately above the upper edge 57 of the closed gate 48. The back wall 64 of the housing 62 presents an inclined downwardly converging interior surface 65 which is traversed adjacent its lower end by a stop or abutment here shown as a rod or pin 66 mounted in the side walls 67 of the housing.

A clamping bar 68 of substantially rectangular cross-section is freely received in the housing and is of sufficient length to provide projecting portions at the opposite end openings of the housing 62. The lower portion 69 provides a clamping face 70 which is adapted to overlie and abut a portion of the gate 48. The lower portion 69 is also provided with a recess or shoulder 71 which can selectively be caused to engage the pin 66.

The upper portion 72 of the bar 68 terminates in a screw-threaded portion 73 of fine pitch for cooperation with a hand screw 74, the end of which is adapted to seat on a portion of the edge surface 63. In order to avoid injury to the screw threads, it is desirable to provide a stop or rest 75 on the bar 68 which will abut the upper edge 76 of the housing 62 when the bar 68 slides downwardly in the housing.

When the gate 48 is open, the bar 68 is in a raised position, shown in phantom view, wherein the shoulder 71 rests upon the pin 66 and the lower portion 69 is thereby retracted or withdrawn so that it is out of the path of pivotal movement of the gate 48. In this raised position, the bar 68 may also rest upon the inclined surface 65 and there is no pressure of the screw 74 on the surface 63.

When the gate 48 is closed, the bar 68 is moved off the supporting pin 66 and permitted to drop in the housing so that the clamping face 70 overlies a portion of the gate. The hand screw 74 is then turned on its seat to force the upper portion 72 of the bar away from the side wall edge 63, the inclined wall 65 providing clearance for this movement. The pin 66 acts as a fulcrum for the long lever arm defined by the upper portion 72 of the bar and its movement is translated into the short lever arm movement of the clamping face 70 against the gate 48. The compounding of force obtained through the combination of the fine pitch screw 74 and the force-multiplying lever exerts a pressure of high magnitude at the clamping face to frictionally integrate the gate 48 with the side walls 44 of the container. The gate thus becomes a significant and vital structural member of the container 43. Despite the high compressive force exerted by the clamp 61, the clamping device is quickly and easily engaged or disengaged manually, yet is free from the problems of close tolerance and accidental release which are associated with conventional toggle clamps or other devices in which deformation of the container in use would create misalignment or lack of registry. Through the heavy hinge 58, the vertical position of the gate 48 also acts as a gusset to strengthen and reinforce the bottom 45 of the container 43, independently of the clamping action.

In utilizing my invention, the vehicle is moved rearwardly to bring the container 43 within the lifting frame 23 with the support rail 52 positioned to be properly engaged by the centering devices 54. To aid this operation, angular or beveled faces 77 are provided at the ends of side frame members 20 and 24 to guide the container into position. It will be apparent that the support rail 52 on the container is slightly above the receiving position of the lifting frame when the container is at ground level, as in FIG. 1. The hydraulic cylinders 27 are then actuated to exert an upward thrust on the parallelogram lifting linkage to cause upward movement of the lifting frame into engagement with the container. The load may cause the fixed frame 19 to move downwardly relatively to the wheels 22 and to the lifting frame 23, as the suspension assembly yields to the load. During further upward movement of the lifting frame, the centering devices may be operative to shift the container to a median position, as previously described. The container is elevated to any desired height within the range of vertical travel of the lifting frame, which may be 5–7 feet maximum, for example, as indicated in phantom outline C in FIG. 1.

If the vehicle is being used in short-trip intra-plant service, the container 43 may be transported in its elevated position by merely hydraulically locking the lifting cylinders 27 at the desired position of elevation. At destination, the lifting frame is lowered until the container comes to rest on the ground. The vehicle can stay with the container while it is unloaded or otherwise serviced or, for more efficient utilization, the vehicle would draw away from the container and go elsewhere to service other cargo bodies which require transport. It will also be noted that under certain circumstances the elevated cargo body may be serviced in its elevated position on the vehicle. For example, if the cargo is to be loaded or unloaded at an elevated platform, such as a loading dock, the container can be raised or lowered to a position in which the ramp gate 48 will rest horizontally upon the dock and cargo can then be removed by mobile trucks from the container while the lifting frame supports the container at the desired level.

Figure 10:
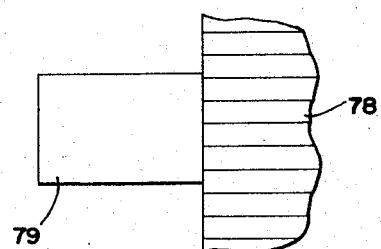
FIG. 10 is a schematic top plan view of a loading dock adapted for use with my cargo handling system.

In FIG. 10 I have schematically indicated how an elevated loading dock 78 can be adapted for deposit and removal of cargo bodies utilizing the disclosed vehicle. The dock 78 can be provided with a fixed or portable platform extension 79 which is of sufficiently narrow dimension to be straddled by the vehicle, and is of sufficient length to accommodate a cargo body, or at least a goodly portion of the length of a cargo body 43. With this arrangement, the container 43 can be handled in substantially the same manner as if it were at ground level. The truck can back into the dock extension and the lifting frame can then be elevated to engage and raise the container. Similarly, a cargo body 43 can be deposited on the loading dock extension 79 by a reversal of this procedure. Similarly, a cargo body can be loaded or unloaded from a railroad car by transfer to the level of the car.

Ordinarily, it is not expedient or desirable to have the lifting cylinders carry the cargo load for any extended period of time. It is preferable that the lifting cylinders 27 be free of load, except during vertical travel of the lifting frame 23. This objective is accomplished by providing an elevated transport position, indicated in phantom outline B of FIG. 1, for the lifting frame 23 whereby the cylinders 27 are relieved of the load by transferring the load to the fixed frame 19 through elevated supports, which will now be described.

Spaced support standards or pedestals 80 are secured to the surface 26 of the frame members 20 and each is provided adjacent its upper end with a transversely extending housing 81 in which a laterally projectable support element 82 is slidably mounted. The support element 82 is here shown as a rectangular metal block whose upper surface 83 is adapted to engage the underside of the lifting frame 23 and support it in a pre-selected position of elevation.

A small, double-acting hydraulic cylinder 84, having a piston rod 85, is mounted exteriorly of the housing 81 and is operatively connected by suitable connecting means 86 to the slidable element 82 to effect coordinate movement of the element 82 with the piston rod 85. In response to actuation of the cylinder 84, the element 82 will be projected into the path of movement of the lifting frame 23, as indicated in phantom outline in FIG. 4. Counteractuation of piston rod 85 causes retractive movement of the support element 82 so that it is withdrawn from the path of vertical movement of the lifting frame.

Figure 4:
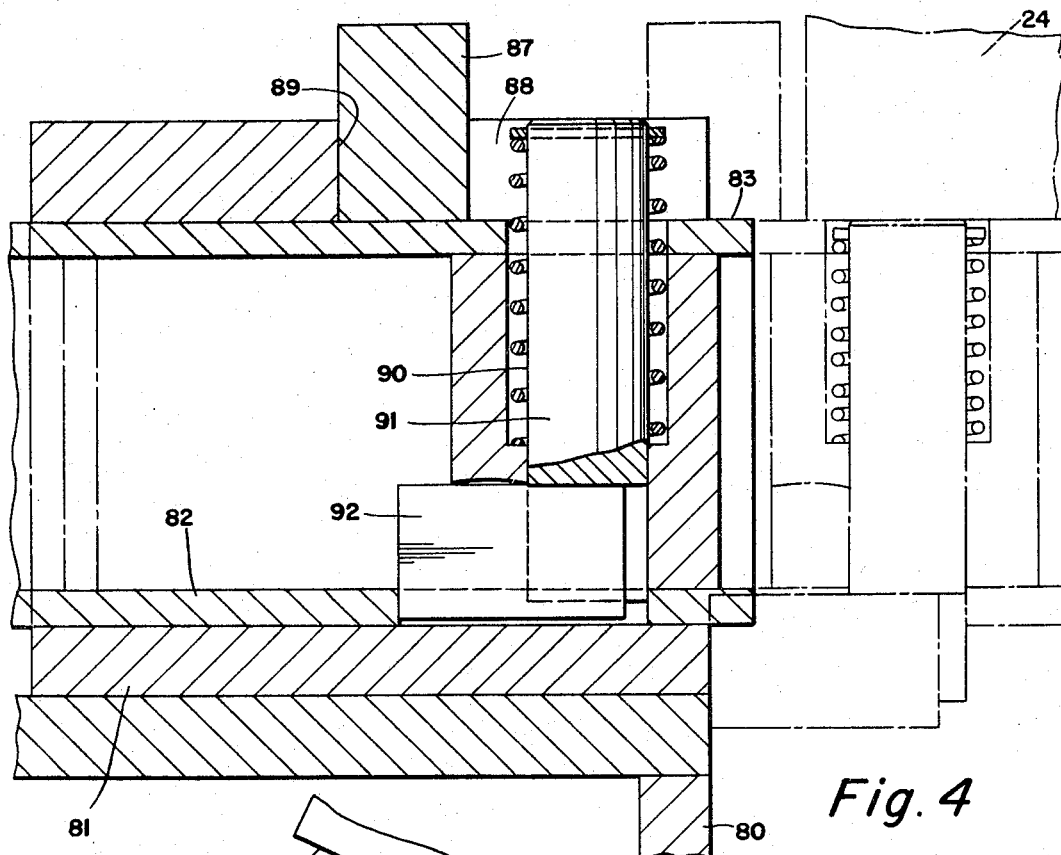
FIG. 4 is a fragmentary sectional view taken on line 4—4 of FIG. 1 and showing means for supporting the lifting frame in transport position.

As best seen in FIG. 4, an upstanding boss or abutment 87 is provided on the element 82 and projects through a clearance slot 88 provided in the housing 81. When the support element 82 is retracted, the boss 87 abuts the outboard end 89 of the slot to limit the outboard movement of the element 82. The boss 87 is located so as to be slightly outboard of the lifting frame when the element 82 is in its advanced or inboard position. Thereby it also serves to retain the lifting frame against lateral displacement such as might be created when the vehicle is traveling around curves.

In order to secure the support element 82 against inadvertent or accidental withdrawal from its engagement with the lifting frame 23, a safety interlock device 90 is provided on the element 82. It comprises a spring-loaded rod 91 slidably mounted in the support block 82 and normally upstanding from the surface 83 of the block in registry with the slot 88. A radial projection 92 on the rod 91 is adapted to abut the inboard face of the housing 81.

When the cargo body 43 has been engaged by the lifting frame 23 and is being elevated for transport, the lifting frame is raised to a position slightly above the level of the support elements 82. During this elevating movement, the elements 82 are in retracted position and do not obstruct the vertical movement of the lifting frame. The cylinders 84 are then actuated to project the support elements 82 and the lifting frame is lowered to rest thereon. During the lowering of the lifting frame, it engages the safety interlock device 90 and depresses the rod 91 so that the rod projects from the underside of the element 82 and locks it against withdrawal into the housing 81. Thus, as long as the weight of the lifting frame is on the interlock device 90, the support elements cannot be retracted.

By means of the support elements 82, the lifting cylinders 27 are relieved of load and the load is transferred from the lifting frame to the fixed or main frame 19 for transport. When the cargo body is to be detached, the lifting cylinders 27 are actuated to elevate the lifting frame 23 slightly to permit retraction of the support elements 82. The lifting frame can then be lowered to deposit the cargo body.

As best seen in FIGS. 1 and 7, I have provided a novel suspension arrangement for the vehicle which not only provides an unobstructed cargo-carrying area to ground level, but also provides improved travel characteristics. Rigidly secured to each of the fixed frame members 20 and depending therefrom is a sturdy wheel suspension member 93 which is disposed within the vertical plane of the member 20. A wheel beam 94 for the forward tandem wheel 22 is pivotally secured at one end by journal element 95 to the suspension member 93. The pivotal connection is at or slightly below the imaginary line connecting the centers of the wheels 22 when the vehicle carries load. The other end of the beam 94 is attached to the lower end of a coil spring assembly 96, whose upper end is connected to the fixed frame 19. The forward tandem wheel 22 is pivotally secured to the beam 94, intermediate its ends, by a stub axle 97. A second wheel beam 98 is pivotally secured to the suspension member 93 by a journal element 99 and the other end of the wheel beam is attached to a second coil spring assembly 100 whose upper end is connected to the fixed frame 19. The rear tandem wheel 22 is pivotally secured to the wheel beam 98, intermediate the ends thereof, by a stub axle 101. The pivot 99 is at or above the center-to-center line of the wheels 22 when the vehicle is in loaded condition. A lever type shock-absorber assembly 102 may be connected between the rear end of frame 19 and the rear beam 98, if desired. It will be noted that the wheel beam connections are such as to give each wheel a slightly rearward movement in its arcuate upward swing in response to impact, thus preventing drag.

By the above-described means, each wheel 22 is independently suspended. The spacing between the coil springs 96 and 100 is approximately twice as great as exists in conventional spring suspension assemblies and the beam arrangement of wheel mounting permits the low-rate coil springs to be compressed in a 2:1 ratio to the vertical linear movement of a wheel 22, thus contributing to side stability and an improved cushioned ride for the load. It will be noted that the beams 94 and 98 are not subject to any torsional deflection, as the torsional force at the pivoted end of the beam is counteracted by an equal and opposite force exerted by the coil spring assembly on the opposite end of the beam. The journals of the wheel beams take the lateral thrust. The coil springs 96 and 100 are so disposed that their longitudinal axes lie in the plane common to the median radial planes of the set of tandem wheels 22. By aligning the entire tandem wheel and suspension assembly within the dimensional confines of the width of a side frame member 20 and entirely below the main fixed frame 19, I am able to achieve maximum load-carrying width for the cargo-body 43 as well as improved suspension characteristics for the vehicle within the dimensional limitations imposed by highway regulations.

The torque tube 34 serves to equalize the operation of the lifting links 28 so that any imbalance in the cargo in the body 43 will not affect the uniform movement of the lifting frame 23. Thus, although each side of the parallelogram lifting linkage is independently actuated by a separate lifting cylinder 27, the elevating operation is not affected by any deflection of the frame nor by any imbalance in the load distribution. If one side of the frame 23 is more heavily loaded than the other side, the greater load on one lifting cylinder 27 is translated through the torque tube 34 into a serve or feed-back effect on the other lifting cylinder 27, which is actuated from a common pressure source, so that the lifting frame 23 maintains parallelism during its vertical movements.

Figure 9:
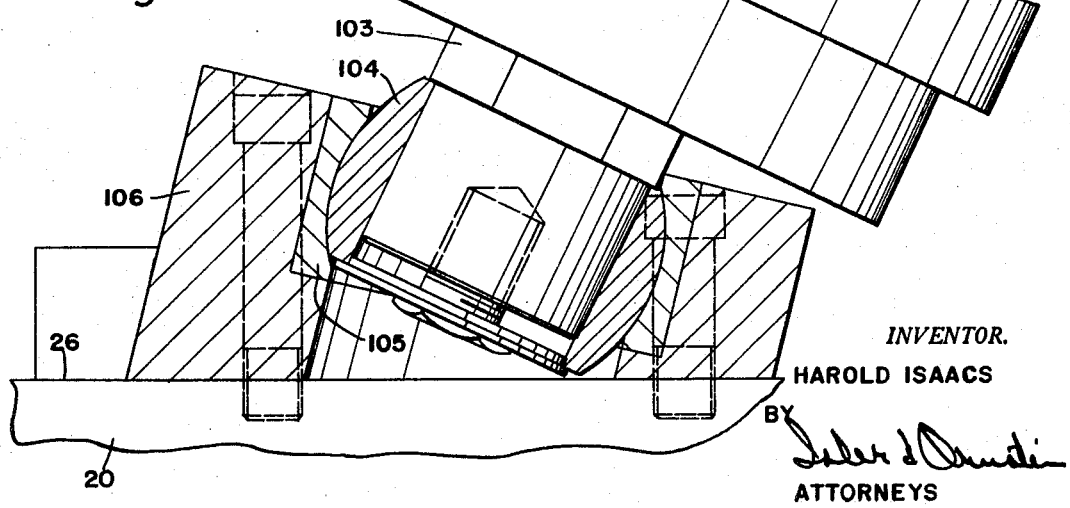
FIG. 9 is a fragmentary sectional view showing the swivel mounting on the lower ends of the lifting cylinders.

As best seen in FIG. 9, each lifting cylinder 27 is swivel mounted to accommodate frame deflections, so that there will be no binding or freezing of the lifting mechanism under adverse conditions. The base 102 of the cylinder 27 terminates in a spherical or ball element 104 which is complementary to a socket element 105 mounted in a housing 106 affixed to frame member 20. Within adequate limits, the cylinder 27 has universal movement which will permit it to adjust itself to frame deflections.

Although I have found that under ordinary conditions the weight of a loaded container 43 is adequate to maintain the container and the lifting frame against "bounce" resulting from road jolts, there may be special conditions, such as rough temporary road conditions or even a service condition in which detachability of the container is not desired, where positive securement of the container to the lifting frame is desirable. Various securing means could be utilized to positively secure the container against vertical movement or against horizontal movement relatively to the lifting frame 23, or even to secure the lifting frame against vertical movement relatively to the fixed frame 19 during road travel. In FIG. 8, I have shown a modification of my invention in which such securing means are utilized between the cargo body 43 and the lifting frame 23. A series of bolts 107 traverse the side frame member 24 and each threadedly engages a nut 108 which is affixed to the side 44 of the cargo body. In this manner the bolt 107 acts as a holddown means to prevent vertical movement of the body 43 relatively to the lifting frame, as well as securing the cargo-body against horizontal shifting, particularly rearwardly of the lifting frame.

The structure which I have described, results in material handling apparatus which is extremely versatile in character and efficient in operation. The ground-loading feature permits substantial savings in loading or unloading cargo, even apart from the other features. Inasmuch as the body can be elevated for loading or unloading to surface levels above ground level, I prefer to use the term surface-loading to define the capability of my apparatus to bring the cargo body and the load to a common service level.

The detachability feature permits efficient use of the vehicle as the cargo bodies can be serviced independently of the presence of the vehicle, so that the vehicle can be utilized for its primary purpose of cargo transportation, rather than standing idle while loading or unloading of the cargo occurs. This feature also permits interchangeability of cargo bodies of various conventional styles with special-purpose bodies, so that the versatility of the vehicle is enhanced.

The apparatus, by its ability to simultaneously handle multiple sizes of bodies in various combinations, also permits containerization practices to be utilized so that smaller unit loads will not have to be comingled with other loads in a single large cargo body.

By placing the frame structure above the wheels and compactly maintaining the wheel suspension assembly within the dimensional outline of the load-carrying frame, I have provided a vehicle which can receive and carry a cargo body below the level of the frame and thus increase the cargo-carrying volume of such a body while maintaining its dimensions within legal limits for highway use. The vehicle is thus distinguished from other material handling vehicles in which the wheels are outboard or inboard of the frame thus not, utilizing the cargo-carrying capacity to its maximum.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In a land vehicle, the combination of a detachable cargo body, a horizontally disposed U-shaped main support frame for said body, a horizontally disposed U-shaped lifting frame carried by said support frame and vertically movable relatively thereto, said frames having longitudinal side members defining an open end for passing said cargo body at ground level, means on said lifting frame for engaging said cargo body to effect vertical movement thereof, power means for actuating vertical movement of said lifting frame relatively to said main frame, ground-engaging wheels arranged in tandem wholly below said main frame within the marginal limits of each of the side members thereof and exteriorly of the marginal limits of said cargo body, a journal bracket depending from each side member of said main frame, a rear wheel beam pivotally secured at one end thereof to said bracket and extending rearwardly therefrom to connection with a rear shock-absorbing assembly, a front wheel beam pivotally secured at one end thereof to said bracket and extending forwardly therefrom to connection with a front shock-absorbing assembly, means rotatably securing one of said tandem wheels to said rear wheel beam intermediate its ends, and means rotatably securing the other of said tandem wheels to said front wheel beam intermediate the ends thereof, whereby each of said wheels is independently suspended, said wheels and said suspension means on each side of said vehicle being wholly below said main frame and within the marginal limits of a side member of said main frame.

2. A combination as defined in claim 1, including a parallelogram lifting linkage between said lifting frame and said main frame on each side of said main frame, each of said lifting linkages being independently operable by a hydraulic lifting cylinder, and a torque bar interconnecting said lifting linkages to effect concurrent lifting movement thereof.

3. In a land vehicle, the combination of a detachable cargo body, a horizontally disposed U-shaped main support frame for said cargo body, a horizontally disposed U-shaped lifting frame carried by said support frame, the open ends of said frames being disposed to pass said body at ground level, an elevating mechanism operatively associated with said lifting frame to effect vertical movement of said lifting frame relatively to said main frame, a parallelogram linkage between said main frame and said lifting frame to maintain parallelism therebetween during such vertical movement of said lifting frame, means on said lifting frame for engaging said cargo body to effect vertical movement thereof, said means comprising angularly adaptable pads on said lifting frame, said cargo body being provided with angularly divergent surfaces engageable with said pads, and ground-engaging means supporting said main frame.

4. A combination as defined in claim 3, wherein said pads center said cargo body relatively to said lifting frame in response to elevating engagement with said angularly divergent surfaces on said body.

5. In a land vehicle, the combination of a detachable cargo body, a main support frame for said body, a vertically movable lifting frame carried by said main frame, means on said lifting frame for engaging said body to effect vertical movement thereof, elevated retainer elements for said lifting frame carried by said main frame, each of said retainer elements including a slidable member disposed for transverse movement relatively to said lifting frame and a locking element movably mounted in said slidable member and movable in response to engagement by said lifting frame to retain said slidable member against withdrawal movement, said slidable member carries a retaining block, said retaining block being engageable with a vertically extending surface of said lifting frame whereby to limit transverse movement of said lifting frame relatively to said main frame, means for selectively projecting said retainer elements into the path of movement of said lifting frame whereby said lifting frame rests thereupon in elevated relationship to said main frame, means for selectively withdrawing said retainer elements from said path of movement whereby said lifting frame can descend to an abutting level with said main frame, and ground engaging means supporting said main frame.

6. In a land vehicle, the combination of a detachable cargo body, a horizontally disposed U-shaped lifting frame having an open end to pass said cargo body at ground level, power means for selectively imparting vertical movement of said lifting frame, means on said lifting frame for engaging said body to effect vertical movement thereof, an end gate pivotally connected to said body and movable to substantially coplanar relationship with the load bearing surface of said body at any loading level within the vertical range of movement of said load bearing surface, said cargo body being a closed van type structure, said end gate being pivotally secured to the bottom wall of said body between the side walls thereof whereby to provide a structural reinforcing end wall member for said cargo body when said end gate is disposed normal to said bottom wall, and force compounding clamping means carried by said body and engageable with any adjacent portion of said end gate to frictionally secure said end gate in a closed position on said body, said clamping means including a housing, a lever slidably received in said housing and projecting therefrom, a clamping face provided at one extremity of said lever, said lever being slidable to project said clamping face over said end gate, and a screw thread actuating element operatively engaging the opposite extremity of said lever to cause compressive movement of said clamping face relatively to said end gate.

References Cited by the Examiner

UNITED STATES PATENTS

| | | | |
|---|---|---|---|
| 1,213,081 | 1/1917 | Dobbins. | |
| 1,740,000 | 12/1929 | Andrews et al. | 220—1.5 |
| 1,773,982 | 8/1930 | Fitch | 220—1.5 |
| 2,547,269 | 4/1951 | Kinsey | 214—390 |
| 2,575,065 | 11/1951 | Merry | 280—104.5 |
| 2,693,288 | 11/1954 | Black | 214—390 |
| 2,913,252 | 11/1959 | Norrie | 280—104.5 |
| 2,934,228 | 4/1960 | Hillberg | 214—390 |
| 3,024,931 | 3/1962 | Grover et al. | |
| 3,083,850 | 4/1963 | Owen | 214—390 |

GERALD M. FORLENZA, *Primary Examiner.*

ALBERT J. MAKAY, *Examiner.*